(12) United States Patent
Pedersen et al.

(10) Patent No.: US 12,457,477 B2
(45) Date of Patent: Oct. 28, 2025

(54) COMMUNICATION DEVICE FOR HEARING PROTECTION APPARATUS WITH IP-BASED AUDIO AND 3D TALK-GROUP FEATURES

(71) Applicant: FALCOM A/S, Ballerup (DK)

(72) Inventors: Søren Christian Voigt Pedersen, Ballerup (DK); Casper Silbo Raft, Ballerup (DK)

( * ) Notice: Subject to any disclaimer, the term of this patent is extended or adjusted under 35 U.S.C. 154(b) by 355 days.

(21) Appl. No.: 17/922,018

(22) PCT Filed: Apr. 28, 2021

(86) PCT No.: PCT/EP2021/061081
§ 371 (c)(1),
(2) Date: Oct. 28, 2022

(87) PCT Pub. No.: WO2021/219694
PCT Pub. Date: Nov. 4, 2021

(65) Prior Publication Data
US 2023/0353988 A1    Nov. 2, 2023

(30) Foreign Application Priority Data

May 1, 2020   (DK) .................................. 202000523

(51) Int. Cl.
| | | |
|---|---|---|
| H04W 4/10 | (2009.01) |
| G06F 3/16 | (2006.01) |
| H04B 1/3827 | (2015.01) |
| H04R 1/10 | (2006.01) |
| H04R 5/033 | (2006.01) |
| H04S 3/00 | (2006.01) |
| H04S 7/00 | (2006.01) |

(52) U.S. Cl.
CPC .............. *H04W 4/10* (2013.01); *G06F 3/162* (2013.01); *H04B 1/385* (2013.01); *H04R 1/1083* (2013.01);
(Continued)

(58) Field of Classification Search
CPC ...... H04B 1/006; H04B 1/3827; H04B 1/385; H04B 2001/3866; H04S 1/005;
(Continued)

(56) References Cited

U.S. PATENT DOCUMENTS 9,198,800 B2 *  12/2015  Killion .................... A61F 11/08
9,230,549 B1    1/2016   Popik et al.
(Continued)

FOREIGN PATENT DOCUMENTS

EP            2028767 A2    2/2009
EP            3517083 A1    7/2019
(Continued)

OTHER PUBLICATIONS

Search Report from Danish Patent App. No. PA 2020 00523 (Oct. 23, 2020) (7 pages).

(Continued)

*Primary Examiner* — Angelica Perez (57) ABSTRACT

A communication device and a related method is disclosed. The communication device comprises a processing unit, a memory, a radio interface, and a hearing protection device interface. The processing unit is configured to obtain a first input from the hearing protection device and/or transmit a first output to the hearing protection device via the hearing protection device interface. The radio interface comprises a digital radio interface. The processing unit is configured to obtain a second input from a radio unit and/or transmit a second output to the radio unit via the digital radio interface.

16 Claims, 3 Drawing Sheets

(52) U.S. Cl.
CPC .............. *H04R 5/033* (2013.01); *H04S 3/008* (2013.01); *H04S 7/302* (2013.01); *H04B 2001/3866* (2013.01); *H04R 2201/107* (2013.01); *H04S 2400/01* (2013.01); *H04S 2400/11* (2013.01); *H04S 2420/01* (2013.01)

(58) Field of Classification Search
CPC ...... H04S 3/008; H04S 7/302; H04S 2400/01; H04S 2400/11; H04S 2420/01; A61F 11/06; A61F 11/145; H04R 1/1083; H04R 5/033; H04R 2201/107; H04W 4/10; G06F 3/162
See application file for complete search history.

(56) References Cited

U.S. PATENT DOCUMENTS

| | | |
|---|---|---|
| 2007/0142072 A1 | 6/2007 | Lassally |
| 2007/0230709 A1 | 10/2007 | Wedge |
| 2014/0198926 A1 | 7/2014 | Killion et al. |
| 2016/0050547 A1 | 2/2016 | Wong |
| 2016/0286019 A1* | 9/2016 | Broadley ............ H04M 1/6058 |
| 2017/0055135 A1 | 2/2017 | Jimenez et al. |
| 2019/0230431 A1* | 7/2019 | Raft ........................ H04R 25/04 |
| 2020/0014416 A1* | 1/2020 | Bayart ................... H04B 1/385 |
| 2021/0385608 A1* | 12/2021 | Stanek ................... H04S 3/008 |

FOREIGN PATENT DOCUMENTS

| | | |
|---|---|---|
| EP | 3703265 A1 | 9/2020 |
| JP | 2009261010 A | 11/2009 |
| WO | 2020086357 A1 | 4/2020 |

OTHER PUBLICATIONS

International Search Report and Written Opinion for PCT Patent App. No. PCT/EP2021/061081 (Jun. 22, 2021) (12 pages).

* cited by examiner

COMMUNICATION DEVICE FOR HEARING PROTECTION APPARATUS WITH IP-BASED AUDIO AND 3D TALK-GROUP FEATURES

The present disclosure relates to a communication device for a hearing protection apparatus and related methods including a method for operating a communication device of a hearing protection apparatus.

BACKGROUND

In combat situations or other stressed environments with a high noise level, it is desirable for a user to effectively protect his/her hearing while enabling the user to communicate with teammates via radio or other communication systems. During combat situations or other stressed environments, a user may need to wear a hearing protection device to attenuate noise, e.g. from gunfire, machinery and other types of constant or intermittent noise while being able to communicate with teammates.

It is however a challenge for the users of hearing protection devices to communicate with groups of teammates such as different groups of teammates via current communication systems.

Further, communication systems may not always match the many different type of radios. Often, the communication systems and the radios need to have exact hardware matching in order to communicate with each other. Therefore, it may be challenging to match a communication system with one or more type of radios.

Further, a drawback of using radio communication is that directional cues of the communication may be lost, causing the user to struggle in locating the source of an input (such as the source of one or more teammates that the user communicates with), which may be dangerous in particular in combat situations, where the risk of friendly fire is heavily increased when directional cues are lost.

SUMMARY

Accordingly, there is a need for communication devices for hearing protection apparatuses and methods which improve the communication between users, such as teammates, during combat situations or in other stressed environments. There may also be a need to increase the situational awareness of a user of a hearing protection apparatused.

A communication device for a hearing protection apparatus comprising a hearing protection device is disclosed. The communication device comprises a processing unit, a memory, a radio interface, and a hearing protection device interface. The processing unit is configured to obtain a first input from the hearing protection device and/or transmit a first output to the hearing protection device via the hearing protection device interface. The radio interface optionally comprises a digital radio interface. The processing unit is configured to obtain a second input from a radio unit and/or transmit a second output to the radio unit via the digital radio interface.

Further, a method of operating a communication device for a hearing protection apparatus comprising a hearing protection device is provided, the communication device comprising a processing unit, a memory, a radio interface, optionally comprising a digital radio interface, and a hearing protection device interface. The method comprises communicating a first input and/or a first output with the hearing protection device via the hearing protection device interface. The method comprises communicating a second input and/or a second output with a radio unit via the digital radio interface.

It is an advantage of the present disclosure that the flexibility and versatility of the communication device is increased. For example, the communication device may be adapted to interface and/or communicate with one or more different type of radios (such as different radios having different levels, different impedance, and/or behavior). Further, it is an advantage that the one or more interfaces (such as the radio interface) of the communication device are provided in simpler manner (such as providing interfaces that are more versatile with respect to different communication systems, such as different radios). For example, the communication device and the radio unit may not need to have exact hardware matching e.g. to be connected and/or communicate with each other. Further, it may be an advantage that the interfaces are not configured and/or defined based on the requirements of the hearing protection devices to be used and/or microphones of the communication system (such as low impedance dynamic microphones).

It is an advantage of the present disclosure that the communication device allows the user to communicate with one or more talk-groups (such as one or more groups of teammates) in a simple manner.

Further, it is an advantage that the security of the communication between the communication device and other communication devices (such as via radio unit, for example via the digital radio interface) is improved.

Further, the quality (such as audio quality) of the communication between the communication device and other communication devices (such as via radio unit, for example via the digital radio interface) is improved.

The user, such as mission-performing user/warfighter, may be provided with more precise and accurate localization/directional cues, so the mission-performing user/warfighter can accurately identify teammates in the surrounding area while staying protected with the hearing protection device and connected as well.

Further, directionality of input signal(s) from different sources can be improved, e.g. in turn providing a more effective spatial separation of sources in multi-source hearing protection devices.

BRIEF DESCRIPTION OF THE DRAWINGS

The above and other features and advantages of the present invention will become readily apparent to those skilled in the art by the following detailed description of exemplary communication devices, methods, and/or server devices thereof with reference to the attached drawings, in which.

DETAILED DESCRIPTION

Various exemplary communication devices and/or methods and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the communication devices, and/or methods. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other communication devices and/or methods even if not so illustrated, or if not so explicitly described.

A communication device for a hearing protection apparatus comprising a hearing protection device is disclosed. The communication device comprises a processing unit, a memory, a radio interface, and a hearing protection device interface.

In one or more exemplary communication devices, the hearing protection device interface comprises one or more hearing protection device interfaces. The hearing protection device interfaces may allow the connection of the communication device to one or more hearing protection devices of the hearing protection apparatus of a user, e.g. such that the first input or at least a part thereof is obtained from the one or more hearing protection devices. The hearing protection device interface and/or the radio interface may comprise wireless or wired interfaces. Accordingly, the hearing protection device interface may comprise a hearing protection device connector for wired connection between the communication device and the hearing protection device.

The processing unit is configured to obtain a first input from the hearing protection device and/or transmit a first output to the hearing protection device via the hearing protection device interface.

The first input may comprise one or more inputs, such as one or more microphone inputs from one or more microphones of the hearing protection device. The first input may comprise a voice input from a voice microphone, such as a boom microphone and/or an ear canal microphone, of the hearing protection device. The first input may comprise a first primary input from a first microphone of the hearing protection device. The first input may comprise a first secondary input from a second microphone of the hearing protection device.

To obtain the first input from the hearing protection device may comprise to receive the first input from the hearing protection device. The first input may be received from one or more microphones of the hearing protection device. In other words, the first input may comprise a first microphone input signal (also denoted first primary input) and/or a second microphone input signal (also denoted first secondary input) from respective first microphone and second microphone. For example, the first input may comprise 2, 3, 4, 5, 10 microphone input signals from respectively 2, 3, 4, 5, 10 different microphones of the hearing protection device.

The first input may be representative of one or more of a sound e.g. a voice of the user wearing the hearing protection device, the sound from a vehicle, a weapon, or a teammate, a direction e.g. the direction from where a sound comes from and/or of where a position of interest is (e.g. an enemy territory), a distance to a sound or a position of interest, and/or a relative direction such as an angle indicating a range or radius of where a sound comes from or of where a position of interest is.

The first output may comprise one or more outputs, such as one or more first output signals, for example one or more first audio output signals to one or more receivers of the hearing protection device (such as the hearing protection device worn by the user), where the receivers may output one or more first audio outputs.

The first output may be based on the first input. In other words, the first output may comprise audio picked up by microphones of the user, e.g. to allow the user to hear audio from the surroundings. This may also be referred to as hear-through processing.

The first output may be based on the second input. In other words, audio received by the radio unit connected to the communication unit is presented to the user. The first output may be based on characteristics of the second input. For example, the first output based on second input on a first channel may be different from the first output based on second input on a second channel. Thus, the first output may be based on a channel which the second input is received on.

The processing unit may be configured to, e.g. in accordance with a determination of presence of second input, mute or decrease a gain applied to the first input in determining the first output. In other words, the first output may be based solely on the second input when a second input is detected or present from the radio interface.

The first output may be representative of one or more of a sound e.g. one or more voices from one or more other hearing protection devices such as from one or more other users wearing the one or more other hearing protection devices, a distance to a sound or a position of interest, and/or a relative direction such as an angle indicating a range or radius of where a sound comes from or of where a position of interest is.

In one or more exemplary communication devices, the processing unit is configured to output the first output (such as output one or more audio output signals) via the hearing protection device interface. Thus, it is to be understood that to transmit the first output may comprise to output the first output. To output the first output via the hearing protection device interface may comprise to output the first output (such as output one or more audio output signals) to the hearing protection device, e.g. to a first receiver of the hearing protection device and/or to a second receiver of the hearing protection device. To output the first output may comprise outputting a first primary output (first primary output signal) to a first receiver and/or to output a first secondary output (first secondary output signal) to a second receiver, e.g. via respective first primary and first secondary terminals of the hearing protection interface. Thus, the first output may comprise a first primary output and a first secondary output. The first primary output may be different from the first secondary output. Outputting different output or output signals to first and second receivers provides that the communication device can tailor spatial perception (e.g. directionality) of the audio that is output to the user. In particular, two different audio signals, e.g. audio from a group and audio from one person, can be tailored to be perceived as coming from two different directions, thereby improving the user's ability to separate the audio.

The first receiver may be a left receiver and the second receiver may be a right receiver, such that the first output may be output to the right and/or the left receiver, e.g. at different amplitudes, level difference, frequency difference, phase shifts, and/or time delay.

The radio interface comprises a digital radio interface. The radio interface may comprise a first radio interface and/or a second radio interface. The first radio interface may be a digital radio interface. The second radio interface may be a digital radio interface or an analogue radio interface. The radio interface, such as the first radio interface and/or the second radio interface may comprise a wired interface. Thus, the radio interface may comprise one or more radio connectors, such as a first radio connector (first radio interface) and optionally a second radio connector (second radio interface), each radio connector comprising terminals for wired connection to a radio unit. In other words, the communication device may be configured to communicate with radio unit(s) via the first radio interface and/or the second radio interface, such as via the digital radio interface (such as by using a universal serial bus, USB, port and/or an ethernet port). In other words, the communication device may be configured to interface directly with one or more other radio units, for example the radio unit, an auxiliary radio unit, and/or one or more other radio units. The radio unit and/or the auxiliary radio unit may be configured to communicate with one or more radio units of one or more other users e.g. via a high bandwidth internet protocol, IP, based network, such as a mobile ad hoc network, MANET, network.

In one or more exemplary communication devices, the digital radio interface, such as the first radio connector and/or the second radio connector, comprises one or more of a universal serial bus, USB, interface, and an ethernet interface.

The radio connectors may comprise one or more port and/or connectors, such as one or more USB ports such as using a USB 2.0, USB 3.0 protocols and/or one or more ethernet ports. The digital radio interface may comprise port(s) and/or connector(s) comprising at least 2 terminals, at least 4 terminals, at least 8 terminals, and/or at least 16 terminals. The digital radio interface may be configured to connect the communication device with one or more radio units. The digital radio interface may be configured to connect the communication device with the radio unit via one or more cables, such as one or more multi conductor cables. The number of conductors in the cables may correspond to the number of terminals of the digital radio interface (such as 4 conductor cable when the digital radio interface comprises 4 terminals). The cables may comprise one or more twisted pairs of conductors.

The processing unit is configured to obtain a second input from a radio unit and/or transmit a second output to the radio unit via the digital radio interface.

The second input may comprise one or more inputs, such as one or more second input signals, for example one or more second audio input signals from the radio unit (such as received from one or more other radio units of one or more other users). The second input may comprise one or more radio inputs e.g. from the radio unit and/or the auxiliary radio unit.

In accordance with an obtainment of the second input, the processing unit may be configured to determine the first output, such as first primary output and/or first secondary output, based on the second input and/or one or more characteristics of the second input.

The second input may be representative of one or more of a sound e.g. one or more voices from one or more other hearing protection devices such as from one or more other users wearing the one or more other hearing protection devices, a distance to a sound or a position of interest, and/or a relative direction such as an angle indicating a range or radius of where a sound comes from or of where a position of interest is.

The second output may comprise one or more outputs e.g. based on the first input, such as a first primary input from the first microphone and/or a first secondary input from the second microphone of the hearing protection device.

The second output may comprise one or more of a sound e.g. a voice of the user wearing the hearing protection device, a distance to a sound or a position of interest, and/or a relative direction such as an angle indicating a range or radius of where a sound comes from or of where a position of interest is.

In one or more exemplary communication devices, the first output is based on the second input and/or the second output is based on the first input.

In one or more exemplary communication devices, the first output is an analogue output based on the second input being a digital input. In one or more embodiments, the communication device may be configured to determine the first output based on the second input. In other words, the communication device may be configured to convert the second input to the first output (such as converting a digital signal to or into an analogue signal).

In one or more exemplary communication devices, the second output is a digital output based on the first input being an analogue input. In one or more embodiments, the communication device may be configured to determine the second output based on the first input. In other words, the communication device may be configured to convert the first input to the second output (such as converting an analogue signal to or into a digital signal).

In one or more exemplary communication devices, the communication device comprises one or more push-to-talk interfaces, such as a first push-to-talk interface, PTT_1, and/or a second push-to-talk interface PTT_2. In one or more embodiments, the communication device comprises a third push-to-talk interface PTT_3, a fourth push-to-talk interface PTT_4, a fifth push-to-talk interface PTT_5, and/or a sixth push-to-talk interface PTT_6. The push-to-talk interface may comprise one or more buttons, such as one or more push-to-talk buttons. The push-to-talk interface may comprise one or more push-to-talk connectors and/or a wireless push-to talk interface, e.g. for wired or wireless connection to one or more remote push-to-talk buttons. The user of the hearing protection system may operate and/or activate the push-to-talk interfaces of the communication device for example to transmit the second output from one or more radio units connected to the radio interface (e.g. to other radio unit(s), such as other radio unit(s) of other user(s), such as other users of a group of users on the same network, for example users of one or more talk-groups, such as via a MANET network).

The one or more push-to-talk buttons may be positioned on a housing of the communication device and/or a housing of the radio unit. The one or more push-to-talk buttons and/or push-to-talk key controls may be wired or wirelessly connected to the push-to-talk interface.

In one or more embodiments, one or more push-to-talk buttons and/or push-to-talk key controls may be positioned remotely from the communication device, for example located at different positions of the user (such as the torso, the arms, the legs, and/or the head of the user) and/or on one or more equipment of the user (such as one or more elements of the hearing protection system, a weapon, a helmet, a vest of the user). This may allow for a simpler and more efficient operation and/or activation of the one or more push-to-talk interfaces for the user (for example by having a push-to-talk buttons and/or push-to-talk key controls at a location that is fast and easy for the user to access).

In one or more exemplary communication devices, the radio interface is or comprises a first radio interface, e.g. a first radio connector, optionally associated with the first push-to-talk interface. The first radio interface may be a digital radio interface. The radio interface may comprise a second radio interface, e.g. a second radio connector, optionally associated with a push-to-talk interface, such as the second push-to-talk interface. The second radio interface may be an analogue radio interface In one or more embodiments, the communication device is configured to communicate with one or more radio units of a hearing protection system (for example via one or more radio interfaces, such as one or more digital radio interfaces and/or analogue radio interfaces) of the user, e.g. such that the second input or at least a part thereof is obtained from the one or more radio units. In one or more embodiments, the communication device is configured to transmit the second output via one or more radio units of the hearing protection system, such as via one or more radio interfaces of the communication device.

For example, the first push-to-talk interface (such as a first push-to-talk button) may be used by the user to transmit the second output via a radio unit connected to the digital radio interface. For example, the second push-to-talk interface (such as a second push-to-talk button) may be used by the user to transmit the second output via a radio unit connected to the analogue radio interface. An advantage of this may be that the communication device may be configured to communicate via one or more digital radio interfaces and/or one or more analogue radio interfaces. The communication device may thereby be more flexible and more customizable with respect to different hearing protection apparatuses (such as different hearing protection systems) having different type of interfaces, such as different radio units having different type of radio interfaces.

In one or more exemplary communication devices, the communication device is configured as a node.

In one or more embodiments, the communication device may be configured as a network node, such as an internet protocol, IP, node e.g. on an IP network (such as a MANET, network). Thus, the communication device may be configured to transmit the second output via a network protocol for transmitting data (such as audio data) over an IP network. The communication device may be configured to obtain the second input via a network protocol for obtaining data (such as audio data) over an IP network. The communication device may thereby allow audio communication for example over voice over internet protocol, VoIP, and/or real-time transport protocol, RTP.

In one or more exemplary communication devices, the communication device is configured to communicate to and/or from one or more channels including a first channel and/or a second channel, such as at least three channels, via the digital radio interface. In one or more embodiments, the communication device is configured to obtain the second input from the radio unit from one or more channels optionally including the first channel and/or the second channel, such as at least three channels, via the digital radio interface. In one or more embodiments, the communication device is configured to transmit the second output to one or more channels (such as to the first channel and/or the second channel), via the digital radio interface optionally in accordance with activation of one or more push-to-talk interfaces. The first channel may be associated with the first push-to-talk interface. Thus, the communication device may be configured to transmit second output on the first channel via first radio interface in accordance with a detection that the first push-to-talk interface has been activated, e.g. by the user pressing the first push-to-talk button. The second channel may be associated with the second push-to-talk interface. Thus, the communication device may be configured to transmit second output on the second channel via first radio interface in accordance with a detection that the second push-to-talk interface has been activated, e.g. by the user pressing the second push-to-talk button.

In one or more embodiments, the communication device is configured to communicate to and/or from one or more channels including a third channel, a fourth channel, a fifth channel, and/or a sixth channel. In some embodiments, the one or more channels may include further channels, such as 10, 15, 20, 50 channels. The third channel may be associated with the third push-to-talk interface. Thus, the communication device may be configured to transmit second output on the third channel via first radio interface in accordance with a detection that the third push-to-talk interface has been activated, e.g. by the user pressing the third push-to-talk button.

In one or more exemplary communication devices, the second radio interface may be associated with the second push-to-talk interface. Thus, the communication device may be configured to transmit second output via the second radio interface in accordance with a detection that the second push-to-talk interface has been activated, e.g. by the user pressing the second push-to-talk button. The second channel may be associated with the third push-to-talk interface. Thus, the communication device may be configured to transmit second output on the second channel via first radio interface in accordance with a detection that the third push-to-talk interface has been activated, e.g. by the user pressing the third push-to-talk button.

In one or more exemplary communication devices, the second radio interface may be digital and associated with the second push-to-talk interface and optionally fourth push-to-talk interface. Thus, the communication device may be configured to transmit second output on a first channel via the second radio interface in accordance with a detection that the second push-to-talk interface has been activated, e.g. by the user pressing the second push-to-talk button and optionally configured to transmit second output on a second channel via the second radio interface in accordance with a detection that the fourth push-to-talk interface has been activated, e.g. by the user pressing the second push-to-talk button.

In one or more exemplary communication devices, the first channel, e.g. on the first radio interface and/or on the second radio interface, is a first talk-group channel assigned to a first talk-group.

The first channel may be associated with a first talk-group and/or the second channel may be associated with a second talk-group. The first channel (such as the first talk-group channel) may have one or more communication devices associated with the first channel (such as one or more users of the first talk-group) obtaining and/or transmitting second inputs and/or second outputs via the first channel, whereby the one or more communication devices of the first talk-group (such as users) may communicate to each other on the first channel (such as on the first talk-group channel).

In one or more embodiments, the communication device is configured to multicast the second output to the one or more other communication devices associated with the first channel. By multicast it may be understood that the communication device transmits the second output (such as the second audio output) to one or more other communication devices simultaneously, for example such that the communication device and each one of the one or more communication devices may communicate with each other via the first channel (for example that all users may hear and speak to each other when using the first channel). In other words, the use of multicast IP addresses may allow to implement talk-group environments.

In one or more embodiments, the communication device is configured to unicast the second output to the one or more other communication devices associated with the first channel. By unicast it may be understood that the communication device transmits the second output (such as the second audio output) to one of the one or more other communication devices at the time via the first channel.

For example, each communication device associated with the first channel may have an assigned IP address, such as a first communication device has a first IP address, a second communication device has a second IP address, a third communication device has a third IP address etc. The first channel (such as first multicast channel) may have an assigned first channel IP address. The communication device may thereby communicate with the one or more other communication devices associated with the first channel simultaneously, via the first channel e.g. by using the first channel IP address.

In one or more exemplary communication devices, the second channel is a second talk-group channel assigned to a second talk-group or is a unicast channel assigned to a specific communication device or radio unit (such as a specific user, for example communicating only with a specific user on the second channel).

The second channel (such as the second talk-group channel) may have one or more communication devices associated with the second channel (such as one or more users of the second talk-group) obtaining and/or transmitting second inputs and/or second outputs via the second channel, whereby the one or more communication devices of the second talk-group (such as users) may communicate to each other on the second channel (such as on the second talk-group channel).

In one or more embodiments, the communication device is configured to multicast the second output to the one or more other communication devices associated with the second channel. By multicast it may be understood that the communication device transmits the second output (such as the second audio output) to one or more other communication devices simultaneously, for example such that the communication device and each one of the one or more communication devices may communicate with each other via the second channel (for example that all users may hear and speak to each other when using the second channel).

In one or more embodiments, the communication device is configured to unicast the second output to a specific communication device of the one or more other communication devices associated with the second channel, via the unicast channel. By unicast it may be understood that the communication device transmits the second output (such as the second audio output) to one of the one or more other communication devices at the time via the second channel (such as via the unicast channel).

For example, each communication device associated with the second channel may have an assigned IP address, such as a first communication device has a first IP address, a second communication device has a second IP address, a third communication device has a third IP address etc. The second channel (such as second multicast channel) may have an assigned second channel IP address. The communication device may thereby communicate with the one or more other communication devices associated with the second channel simultaneously, via the second channel e.g. by using the second channel IP address.

The communication devices associated with the first channel and the communication devices associated with the second channel may be identical or different (such as the same users or different users on the different channels, such as different talk-groups). For example, a first group of users (such as a first unit of mission performing users, such as a first squad of soldiers) may be associated with the first channel, such as associated with the first talk-group. For example, the first group comprises a group of 5-15 users, such as a first squad of soldiers comprising e.g. 5-15 soldiers being able to communicate with each other via the first channel.

The second channel on the other hand may for example have a second group of users associated with the second channel, where the second group of users comprises a larger group of users, such as a group of 100-150 users e.g. a company of soldiers, such as 100-150 soldiers being able to communicate with each other via the second channel. In some embodiments. the second group of users may comprise the first group of users (such as the company of soldiers comprises the first squad of soldiers), whereby the users of the first group may communicate both with each other via the first channel and with other users of the second group (such as users that are only associated with the second channel, for example users that are only in the second group) via the second channel.

In one or more exemplary communication devices, the first push-to-talk interface is assigned to the first channel and/or the second push-to-talk interface is assigned to the second channel.

In one or more exemplary communication devices, the third push-to-talk interface is assigned to the third channel, the fourth push-to-talk interface is assigned to the fourth channel, the fifth push-to-talk interface is assigned to the fifth channel, and/or the sixth push-to-talk interface is assigned to the sixth channel.

In one or more exemplary communication devices, a first set of push-to-talk interfaces, e.g. at least comprising a plurality of push-to-talk interfaces including the first push-to-talk interface, is assigned to the first radio interface and/or a second set of push-to-talk interface, e.g. at least including the second push-to-talk interface is assigned to the second radio interface.

In one or more exemplary communication devices, the communication device is configured to transmit to the first talk-group on the first channel in response to receiving a first request via the first push-to-talk interface. In other words, the communication device may be configured to transmit to the first talk-group on the first channel via the first radio interface in accordance with a user activating the first push-to-talk interface. In one or more embodiments, the communication device is configured to transmit the second output to the first channel (such as via the radio unit) when the user operates and/or activates the first push-to-talk interface. In other words, the user may be able to communicate (such as transmit one or more audio signals) with other users associated with the first channel, when pushing the first push-to-talk interface (such as first push-to-talk button).

In one or more exemplary communication devices, the communication device is configured to transmit to the second talk-group on the second channel in response to receiving a second request via a push-to-talk interface assigned to the second channel, such as the second push-to-talk interface or the third push-to-talk interface.

In one or more exemplary communication devices, the communication device is configured to transmit the second output to the second channel (such as via the radio unit) when the user operates and/or activates the second push-to-talk interface. In other words, the user may be able to communicate (such as transmit one or more audio signals) with other users associated with the second channel, when pushing or otherwise activating the second push-to-talk interface (such as second push-to-talk button).

In one or more exemplary communication devices, the communication device is configured to transmit via a second radio connector in response to receiving a second request via the second push-to-talk interface. In one or more embodiments, the communication device is configured to transmit the second output to a second radio unit via second radio connector of the radio interface when the user operates and/or activates the second push-to-talk interface. In other words, the communication device may allow a user to conveniently use a plurality of radio units by selectively activating respective first push-to-talk interface and second push-to-talk interface.

In one or more embodiments, the communication device is configured to transmit to the second talk-group on the second channel or a third talk-group on the third channel in response to receiving a third request via the third push-to-talk interface.

In one or more embodiments, the communication device is configured to transmit the second output to the third channel (such as via the radio unit) when the user operates and/or activates the third push-to-talk interface. In other words, the user may be able to communicate (such as transmit one or more audio signals) with other users (radio units) associated with the third channel, when pushing the third push-to-talk interface (such as third push-to-talk button).

It may therefore be an advantage for the user to be able to communicate through one or more different channels (for example to one or more different talk-groups) merely by operating one or more different push-to-talk interfaces.

In one or more exemplary communication devices, the communication device is configured to encode (for example by using an encoder, such as an audio encoder, and/or encrypting) the first input from the hearing protection device for provision of the second output to the radio unit via the digital radio interface.

In one or more embodiments, the communication device is configured to audio encode the first audio input from the hearing protection device for provision of the second audio output signal to the radio unit via the digital radio interface. In one or more embodiments, the encoder is optimized for the hearing protection device (such as optimized for a specific type of hearing protection device, for example hearing protection device comprising an in-ear bone conduction headset).

In one or more exemplary communication devices, the communication device is configured to decode (for example by using a decoder, such as an audio decoder, and/or decrypting) the second input from radio unit(s) for provision of the first output via the hearing protection device interface.

In one or more embodiments, the communication device is configured to audio decode the second audio input from the radio unit for provision of the first audio output to the hearing protection device via the hearing protection device interface. In one or more embodiments, the decoder is optimized for the hearing protection device (such as optimized for a specific type of hearing protection device, for example hearing protection device comprising an in-ear bone conduction headset).

In one or more embodiments, the communication device comprises (such as stores on the memory) one or more codecs (such as one or more audio codecs) for encoding and/or decoding the first input and/or the second input. The communication device may be configured to update the one or more codecs, for example by firmware updates.

In one or more embodiments, the communication device is configured to perform error concealment and/or packet handling of the second input from the radio unit(s) for provision of the first output via the hearing protection device interface.

In one or more exemplary communication devices, the communication device is configured to select a first output scheme and determine the first output based on the second input on the first channel and/or the second channel in accordance with the first output scheme.

In one or more embodiments, the first output scheme may be indicative of how second input from the different channels or even from different radio units are transmitted (such as output) to the hearing protection device (such as which second input from which channel/radio unit the first output should comprise). In other words, the first output scheme may be indicative of a prioritization of which second input from which channel/radio unit the first output should comprise, for example when there is second input on one or more channels (such as both channels are active, for example audio input signal such as speech on all channels). For example, if both the first channel and the second channel are active i.e. there is second input from both the first channel and the second channel, then the first output scheme comprises to transmit (such as to output) only the second input from the first channel, i.e. the second channel is set to 0, G_2=0, and thereby prioritizing the first channel over the second channel.

In one or more exemplary communication devices, the first output scheme comprises a first 3D processing scheme, e.g. with a first HRTF (HRTF_1) and/or a first gain (G_1), associated with the first channel and/or a second 3D processing scheme, e.g. with a second HRTF (HRFF_2) and/or a second gain (G_2), associated with the second channel, and wherein the first output, such as first primary output for the first receiver and/or first secondary output for the second receiver, is based on the first 3D processing scheme and/or the second 3D processing scheme. The first 3D processing scheme may be different from the second 3D processing scheme. In other words, first output based on the first 3D processing scheme may be perceived differently by the user, e.g. appear to come from different direction, than first output based on the second 3D processing scheme.

In one or more exemplary communication devices, the first 3D processing scheme and/or the second 3D processing scheme apply different directionality based on which channel is active. In other words, the communication device may provide one or more spatial audio playback features, such that multiple talk-groups may be presented at different locations and thereby giving the user (such as a soldier) improved ability to distinguish and prioritize between incoming channels (such as one or more audio streams). This may improve the situational awareness of the user of the communication device which may be enhanced in real-time, which in turn reduces decision time.

In one or more exemplary communication devices, the communication device is configured to apply the first 3D processing scheme to second input on the first channel, and/or to apply the second 3D processing scheme to second input on the second channel.

The first output scheme may define a priority between channels and/or radio units. In other words, the first output scheme may, e.g. when the second channel has a higher priority than the first channel, define that the first channel is processed with a reduced gain in accordance with a detected input on the second channel (active second channel) compared to a situation where the second channel is not active (no input is detected). The first output scheme may, e.g. when the second channel has a higher priority than the first channel, define that the second channel is processed with an increased gain in accordance with a detected input on the first channel (active second channel) compared to a situation where the first channel is not active (no input is detected). Thus, the first output scheme may be based on a determination of which channels in the second input that are active. In one or more exemplary communication devices, the first output scheme mutes or turns off channel(s) with less priority. For example, the first output scheme may, e.g. when the second channel has the highest priority, turn down, turn off or mute the first channel (and other channels) when the second channel is active.

For example, the user of the communication device, e.g. in a combat situation, may experience improved situational awareness and localization of one or more other users (such as teammates), which may be highly beneficial for the user operating in stressful environments (such as enemy territories/combat situations).

For example, if the first channel is active, the first output may be based on the second input on the first channel, and the first output is transmitted (such as output on one or more receivers of the hearing protection device) to the hearing protection device with an applied first filter function, such as a first head related transfer function, HRTF, HRTF_1, to give a directional indication associated with the first channel (such that the user gets an indication that the first output is based on the second input from the first channel, e.g. by simulating that the audio output comes from a specific direction and/or is output only in one receiver of the hearing protection device). In one or more embodiments, the first output is determined (such as estimated or calculated) with HRTF derivations e.g. using a first audio input from a first microphone and\or the second microphone and/or first position data (such as from a first positioning device of the hearing protection system) e.g. such as level difference, frequency difference, phase shifts, and/or time delays. In other words, the processing unit of the communication device may comprise a first filter module for filtering the second input (such as second input signal, such as second audio input signal) from the first channel according to the first filter function for provision of the first output (such as a first left output signal and a first right output signal).

In other words, the processing unit of the communication device may comprise a second filter module for filtering the second input (such as second input signal (such as second audio input)) from the second channel according to the second filter function for provision of the first output (such as a first left output signal (also denoted first primary output) and a first right output signal (also denoted first secondary output)). In one or more embodiments, the first filter module and the second filter module may be provided as one filter module.

For example, if the second channel is active, the first output is based on the second input on the second channel, and the first output is transmitted (such as output on one or more receivers of the hearing protection device) to the hearing protection device with an applied second filter function, such as a second HRTF, HRTF_2, to give a directional indication associated with the second channel (such that the user gets an indication that the first output is based on the second input from the second channel, e.g. by simulating that the audio output comes from a specific direction and/or is output only in one receiver of the hearing protection device). In one or more embodiments, the first output scheme comprises for example HRTF_1 and/or G_1=1, and/or HRTF_2 and/or G_2=1.

In one or more exemplary communication devices, the first 3D processing scheme (first filter function) is associated with the first channel being a first talk-group channel assigned to a first 3D talk group.

In one or more embodiments, the second 3D processing scheme (second filter function) is associated with the second channel being a second talk-group channel assigned to a second 3D talk group.

The first 3D talk-group and the second 3D talk-group may be talk-groups where each user on the talk group gets an indication from the audio output that the second input from the one or more other users comes from a specific direction and/or is output only in one receiver of the hearing protection device depending on the relative positions of the users of the talk-group with respect to each other.

A method for operating a communication device of a hearing protection apparatus comprising a hearing protection device is disclosed, the communication device comprising a processing unit, a memory, a radio interface comprising a digital radio interface, and a hearing protection device interface. The method comprises communicating a first input and/or a first output with the hearing protection device via the hearing protection device interface. The method comprises communicating a second input and/or a second output with a radio unit via the digital radio interface.

It is to be understood that a description of a feature in relation to communication device(s) is also applicable to the corresponding method(s) and vice versa.

Figure 1:
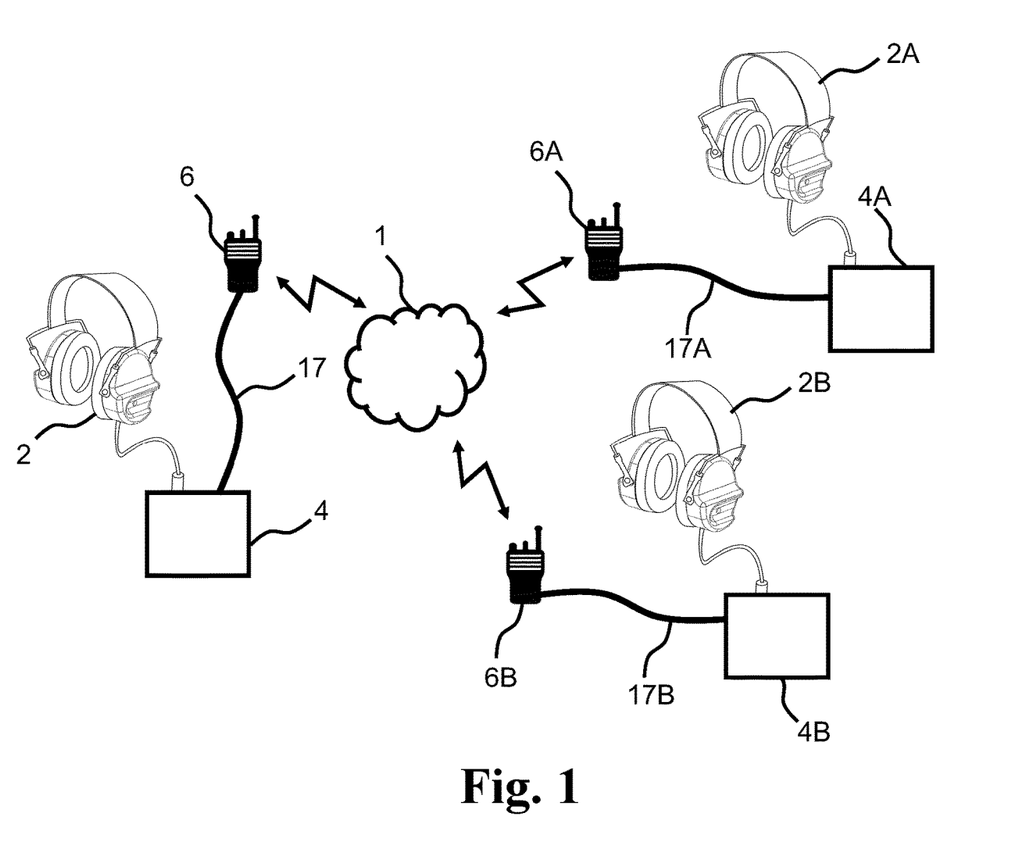
FIG. 1 schematically illustrates a communication device according to the disclosure communicating with one or more other communication devices over a network.

FIG. 1 schematically illustrates an exemplary communication device 4 according to the disclosure. The communication device 4 communicates with the radio unit 6 (e.g. via a digital radio interface, not shown, such as by using a universal serial bus, USB, port and/or an ethernet port) and is connected to the radio unit 6 via a cable-connection 17.

The communication device 4 is connected to a hearing protection device 2. The radio unit 6 e.g. of a first user is configured to communicate, over a network 1 (e.g. a high bandwidth internet protocol, IP, based network, such as a mobile ad hoc network, MANET, network), with one or more other radio units 6A, 6B, for example a second radio unit 6A of a second user and/or a third radio unit 6B of a third user. The second radio unit 6A is connected via a connection 17A to a communication device 4A of the second user, and the third radio unit 6B is connected via a connection 17B to a communication device 4B of the third user. The communication device 4A is connected to a hearing protection device 2A of the second user, and the communication device 4B is connected to a hearing protection device 2B of the third user.

In one or more embodiments, the communication device 4 is configured as a network node, such as an internet protocol, IP, node e.g. on the network 1 (e.g. IP network such as a MANET, network). The communication device 4 may thereby be configured to transmit and/or obtain a second output 32 and/or a second input 25 via a network protocol for transmitting and/or obtaining data (such as audio data) over the network 1 (e.g. IP network). The communication device 4 may thereby allow audio communication for example over voice over internet protocol, VoIP, and/or real-time transport protocol, RTP between the user of the communication device 4 and one or more other users of one or more other communication devices 4A, 4B.

For example, the communication devices 4, 4A, 4B are associated with a first channel and each communication device 4, 4A, 4B has an assigned IP address, such as the communication device 4 (e.g. first communication device) has a first IP address, a second communication device 4A has a second IP address, a third communication device 4B has a third IP address etc. The first channel (such as first multicast channel) may have an assigned first channel IP address. The communication device 4 may thereby communicate with the one or more other communication devices 4A, 4B associated with the first channel simultaneously, via the first channel e.g. by using the first channel IP address.

Figure 2:
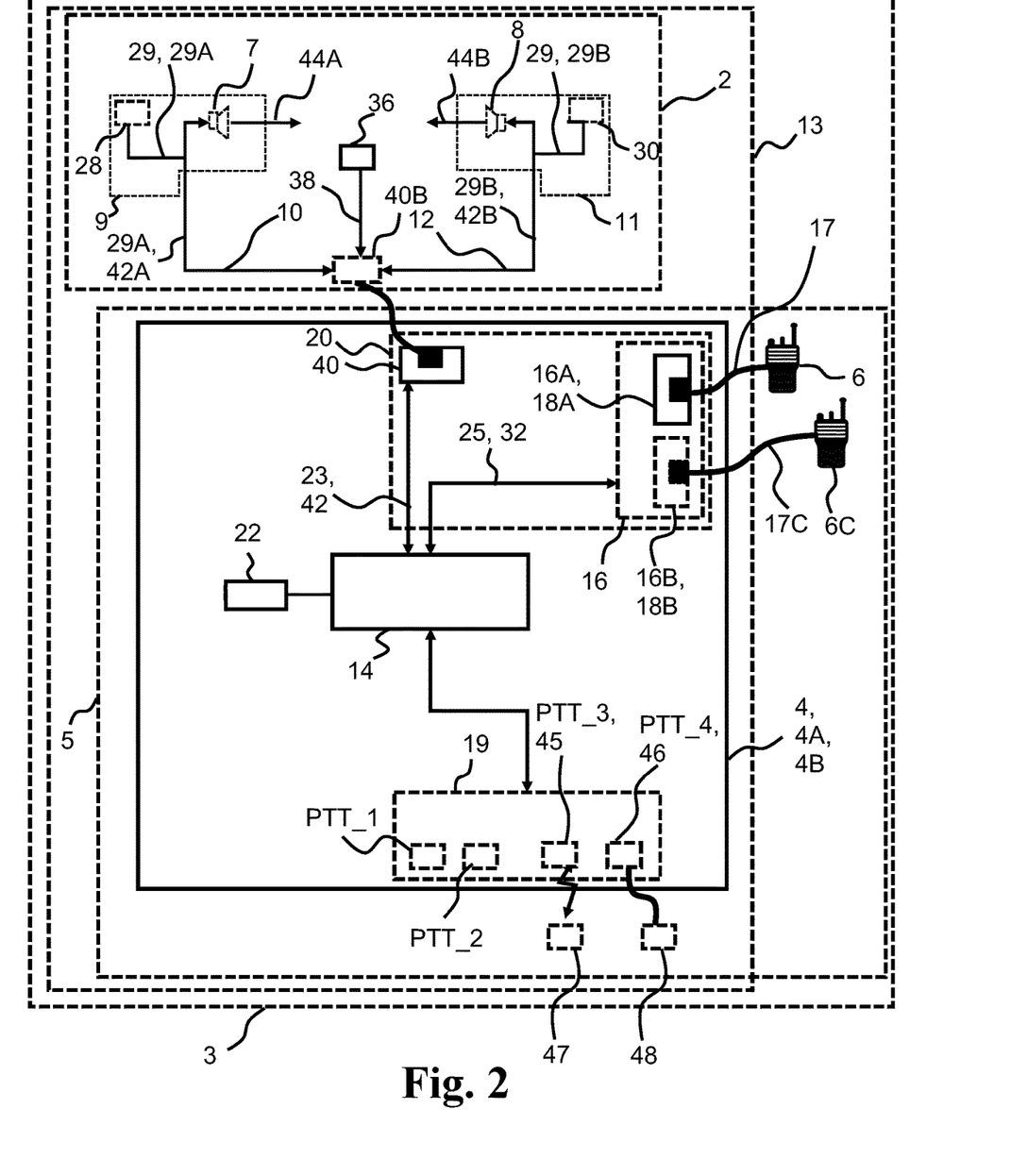
FIG. 2 is a block diagram of an exemplary communication device according to the disclosure.

FIG. 2 shows an exemplary hearing protection system 3 comprising an exemplary communication device 4 according to the disclosure, a hearing protection device 2, and a radio unit 6. The communication device 4 comprises a processing unit 14, a memory 22, a radio interface 16, and a hearing protection device interface 40. The radio interface 16 may comprise a first radio interface 16A and/or a second radio interface 16B. The first radio interface 16A may be a digital radio interface. The second radio interface 16B may be a digital radio interface or an analogue radio interface. The radio interface 16, such as the first radio interface 16A and/or the second radio interface 16B, may comprise a wired interface. Thus, the radio interface 16 may comprise one or more radio connectors, such as a first radio connector 18A (first radio interface 16A) and optionally a second radio connector 18B (second radio interface 16B), each radio connector comprising terminals for wired connection to a radio unit. In one or more embodiments, the hearing protection device comprises a hearing protection device interface 40B.

The radio interface 16 may allow the connection of the communication device 4 to the radio unit 6 of a hearing protection system 3 or a communication system 5 of the user, e.g. such that the second input 25 is obtained from the radio unit 6, through (or partly through) a second input signal 26, and such that the second output 32 is transmitted to the radio unit 6, through (or partly through) a second output signal 33 (such as a second audio output signal 34) via the digital radio interface.

In one or more exemplary communication devices, the first radio interface 16A is a digital interface and comprises one or more of a universal serial bus, USB, interface, and an ethernet interface. The digital first radio interface 16A may comprise one or more port and/or connectors, such as one or more USB ports such as using a USB 2.0, USB 3.0 protocols and/or one or more ethernet ports for connecting the digital first radio interface 16A to the radio unit 6. The digital first radio interface 16A may comprise a port and/or connector comprising at least 2 terminals, at least 4 terminals, at least 8 terminals, and/or at least 16 terminals. The digital first radio interface 16A may be configured to connect the communication device 4 with the radio unit 6, such as via one or more connectors. The digital first radio interface 16A may be configured to connect the communication device 4 with the radio unit 6 via a cable 17, such as one or more multi conductor cables. The number of conductors in the cables may correspond to the number of terminals of the digital radio interface (such as 4 conductor cable when the digital radio interface comprises 4 terminals). The cable 17 may comprise one or more twisted pairs of conductors.

In one or more exemplary communication devices, the second radio interface 16B comprises a second radio connector 18B for connecting the communication device 4 to an auxiliary radio unit 6C. The auxiliary radio unit 6C may be connected via the second radio interface 16B. The second radio interface 16B may comprise a port and/or connector comprising at least 2 terminals, at least 4 terminals, at least 8 terminals, and/or at least 16 terminals. The second radio interface 16B may be configured to connect the communication device 4 with the auxiliary radio unit 6C, such as via one or more connectors, such as the second radio connector 18B. The second radio interface 16B may be configured to connect the communication device 4 with the auxiliary radio unit 6C via a connection 17C (such as a cable), such as one or more multi conductor cables. The number of conductors in the cables may correspond to the number of terminals of the second radio interface 16B (such as 4 conductor cable when the second radio interface comprises 4 terminals). The cable 17C may comprise one or more twisted pairs of conductors.

The hearing protection device interface 40 may allow the connection of the communication device 4 to the hearing protection device 2 of the hearing protection apparatus 13 of the user, e.g. such that the first input 23 is obtained from the hearing protection device 2, through (or partly through) a first input signal 24. A voice input 38 from a voice microphone 36 of the hearing protection device may be constitute or be comprised in the first input 23/first input signal 24. The processing unit 14 is configured to obtain the first input 23 from the hearing protection device 2 and/or transmit the first output 42 to the hearing protection device 2 via the hearing protection device interface 40.

The first input 23 optionally comprises first primary input 29A from first microphone 28 and/or second primary input 29B from second microphone 30. The first output 42 comprises first primary output (first primary output signal) 42A for the first receiver 7 and first secondary output 42B for the second receiver 8. The first receiver 7 transforms first primary output 42A to first audio output 44A that is presented to the user, and the second receiver 8 transforms first secondary output 42B to second audio output 44B that is presented to the user The processing unit 14 is configured to obtain a second input 25 from the radio unit 6 and/or transmit the second output 32 to the radio unit 6 via the digital first radio interface 16A. The processing unit 14 is optionally configured to obtain second input 25 from the auxiliary radio unit 6C and/or transmit the second output 32 to the auxiliary radio unit 6C via the second radio interface 16B.

In one or more exemplary communication devices, the first output 42, such as first primary output 42A and/or first secondary output 42B, is based on the second input 25 and the second output 32 is based on the first input 23, such as voice input 38 and optionally one or more of first primary input 29A and first secondary input 29B.

In one or more exemplary communication devices, the first output 42 is based on the second input 25 and the first input, 23, such as the first primary input 29A and/or the first secondary input 29B. The second output 32 is optionally based on the first input 23.

The communication device 4 comprises push-to-talk interface 19 including first push-to-talk interface PTT_1 and/or second push-to-talk interface PTT_2. The first push-to-talk interface PTT_1 is optionally a first push-to-talk button and/or the second push-to-talk interface PTT_2 is optionally a second push-talk button. The first push-to-talk interface PTT_1 and the second push-to-talk interface PTT_2 are optionally assigned to respective first channel and second channel of first radio interface 16A/radio 6. The push-to-talk interface 19 optionally comprises a third push-to-talk interface PTT_3 and/or a fourth push-to-talk interface PTT_4. The third push-to-talk interface PTT_3 is optionally a third push-to-talk button and may be assigned to a third channel of first radio interface 16A/radio 6 or assigned to second radio interface 16B/auxiliary radio 6C. The fourth push-to-talk interface PTT_4 is optionally a fourth push-to-talk button and may be assigned to a fourth channel of first radio interface 16A/radio 6 or assigned to second radio interface 16B/auxiliary radio 6C. That a push-to-talk interface is assigned to or associated with a channel/radio interface is to be understood as the second output being transmitted on the channel/radio interface when the push-to-talk interface is activated, e.g. by a user pressing push-to-talk button.

In one or more exemplary communication devices, a push-to-talk interface, such as PTT_3, comprises a wireless push-to-talk transceiver 45 for wireless connection to one or more remote push-to-talk buttons, including wireless push-to-talk button 47. Each remote push-to-talk button may be assigned to a channel/radio interface of communication device.

In one or more exemplary communication devices, a push-to-talk interface, such as PTT_4, comprises a push-to-talk connector 46 for wired connection (mechanical and electrical connection) to a remote push-to-talk button 48.

In one or more exemplary communication devices, the digital first radio interface 16A is associated with the first push-to-talk interface PPT_1 and/or the radio interface 16 comprises a second radio interface 16B being an analogue radio interface associated with the second push-to-talk interface PTT_2.

In one or more embodiments, the communication device 4 is configured to communicate with one or more radio units 6, 6C of a hearing protection system 3 (for example via one or more radio interfaces 16, 16A, 16B, such as one or more digital radio interfaces and/or analogue radio interfaces) of the user, e.g. such that the second input 25 or at least a part thereof is obtained from the one or more radio units 6, 6C. In one or more embodiments, the communication device 4 is configured to transmit the second output 32 via one or more radio units 6, 6C of the communication system 5, such as via one or more radio interfaces 16, 16A, 16B of the communication device 4, e.g. in accordance with a user activating different push-to-talk interfaces.

In one or more exemplary communication devices, the communication device 4 is configured to communicate to one or more channels including a first channel and/or a second channel via the digital radio interface 16A.

In one or more embodiments, the communication device 4 is configured to obtain the second input 25 from the radio unit 6 from one or more channels (such as from the first channel and/or the second channel), via the digital radio interface 16A. In one or more embodiments, the communication device 4 is configured to transmit the second output 32 to the radio unit 6 to one or more channels (such as to the first channel and/or the second channel), via the digital first radio interface 16A. In one or more embodiments, the communication device 4 is configured to transmit the second output 32 to the auxiliary radio unit 6C to one or more channels (such as to the first channel and/or the second channel), via digital second radio interface 18A.

In one or more exemplary communication devices, the first channel is a first talk-group channel assigned to a first talk-group.

In one or more exemplary communication devices, the first push-to-talk interface PTT_1 is assigned to the first channel and/or the second push-to-talk interface PTT_2 is assigned to the second channel. In one or more embodiments, the third push-to-talk interface PTT_3 is assigned to the third channel, and/or the fourth push-to-talk interface PTT_4 is assigned to the fourth channel.

In one or more exemplary communication devices, the communication device 4 is configured to transmit to the first talk-group on the first channel in response to receiving a first request via the first push-to-talk interface PTT_1. In one or more embodiments, the communication device 4 is configured to transmit the second output 32 to the first channel (such as via the radio unit 6) when the user operates and/or activates the first push-to-talk interface PTT_1. In other words, the user may be able to communicate (such as transmit one or more audio signals) with other users associated with the first channel, when pushing the first push-to-talk interface PTT_1 (such as first push-to-talk button).

In one or more embodiments, the communication device 4 is configured to transmit to the second talk-group on the second channel in response to receiving a second request via the second push-to-talk interface PTT_2. In one or more embodiments, the communication device 4 is configured to transmit the second output 32 to the second channel (such as via the radio unit 6) when the user operates and/or activates the second push-to-talk interface PTT_2.

In one or more embodiments, the communication device 4 is configured to transmit to the third talk-group on the third channel in response to receiving a third request via the third push-to-talk interface PTT_3. In one or more embodiments, the communication device 4 is configured to transmit the second output 32 to the third channel (such as via the radio unit 6) when the user operates and/or activates the third push-to-talk interface PTT_3.

In one or more embodiments, the communication device 4 is configured to transmit to the fourth talk-group on the fourth channel in response to receiving a fourth request via the fourth push-to-talk interface PTT_4. In one or more embodiments, the communication device 4 is configured to transmit the second output 32 to the fourth channel (such as via the radio unit 6) when the user operates and/or activates the fourth push-to-talk interface PTT_4.

In one or more exemplary communication devices, the communication device 4 is configured to encode (for example by using an encoder, such as an audio encoder, and/or encrypting) the first input 23 from the hearing protection device 2 for provision of the second output 32 to the radio unit 6 via the digital first radio interface 16A or for provision of the second output 32 to the auxiliary radio unit 6C via the second radio interface 16B.

In one or more embodiments, the communication device 4 is configured to audio encode the first input 23 from the hearing protection device for provision of the second audio output signal 34 to the radio unit 6 via the digital radio interface 16A.

In one or more exemplary communication devices, the communication device 4 is configured to decode (for example by using a decoder, such as an audio decoder, and/or decrypting) the second input 25 from the radio unit 6 or auxiliary radio unit 6C for provision of the first output 42 (such as the first primary output 42A and/or first secondary output 42B) via the hearing protection device interface 40.

In one or more exemplary communication devices, to obtain the first input 23 comprises to obtain a first primary input 29A from a first microphone 28 and/or a first secondary input 29B from a second microphone 30, via the hearing protection device interface 40. The first microphone 28 may be a microphone of the hearing protection apparatus 13, for example of the hearing protection device 2. The first primary input 29A may be generated at the first microphone 28 and the first secondary input 19B may be generated at the second microphone 30 of the hearing protection apparatus 13, e.g. at the first microphone 28 and/or the second microphone 30 of the hearing protection device 2, based e.g. on an audio input from the user (such as speech). In one or more exemplary communication devices, to obtain the first input 23 comprises to obtain a voice input 38 from a voice microphone 36 via the hearing protection device interface 40.

To transmit the first output 42 to the hearing protection device may comprise to transmit, e.g. output, first primary output 42A and first secondary output 42B via the hearing protection device interface 40 to output the first audio output 44A.

To output the first output 42 via the hearing protection device interface 40 may comprise to output first primary output 42A to the hearing protection device 2, e.g. to a first receiver 7. To output the first output 42 via the hearing protection device interface 40 may comprise to output first secondary output 42B to the hearing protection device 2, e.g. to a second receiver 8. The first receiver 7 may be comprised in a first ear protector 9, such as a first earpiece or a first earmuff, of the hearing protection device 2, the first earpiece 9 comprising a first connection 10, such as a left connection. The second receiver 8 may be comprised in a second ear protector 11, such as a second earpiece or a second earmuff, of the hearing protection device 2, the second earpiece 11 comprising a second connection 12, such as a right connection. The first audio output 44A may be output by the first receiver 7 and/or the second audio output 44B may be output by the second receiver 8.

In one or more exemplary communication devices, the first output scheme comprises a first 3D processing scheme associated with the first channel and a second 3D processing scheme associated with the second channel, and wherein the first output is based on the first 3D processing scheme and/or the second 3D processing scheme.

For example, if the first channel is active, the first output 42 is based on the second input 25 on the first channel, and the first output 42 is transmitted, such as output, with an applied first filter function, such as a first head related transfer function, HRTF, HRTF_1, to give a directional indication associated with the first channel (such that the user gets an indication that the first output 42 is based on the second input 25 from the first channel, e.g. by simulating that the first audio output 44A comes from a specific direction and/or is output only in one receiver 7 or 8 of the hearing protection device 2). In one or more embodiments, the first output 42 is determined (such as estimated or calculated) with HRTF derivations e.g. using first primary input 29A from the first microphone 28 and/or first secondary input 29B from the second microphone 30. The processing unit 14 of the communication device 4 may comprise a first filter module for filtering the second input 25 from the first channel according to the first filter function for provision of the first output 42 (such as a first primary output 42A to the first receiver 7 and a first secondary output 42B to the second receiver 8).

For example, if the second channel is active, the first output 42 is based on the second input 25 on the second channel, and the first output 42 is transmitted, such as output, with an applied second filter function, such as a second head related transfer function, HRTF, HRTF_1, to give a directional indication associated with the second channel (such that the user gets an indication that the first output 42 is based on the second input 25 from the second channel, e.g. by simulating that the first audio output 44A comes from a specific direction and/or is output only in one receiver 7 or 8 of the hearing protection device 2). In one or more embodiments, the first output 42 is determined (such as estimated or calculated) with HRTF derivations e.g. using first primary input 29A from the first microphone 28 and/or first secondary input 29B from the second microphone 30. The processing unit 14 of the communication device 4 may comprise a second filter module for filtering the second input 25 from the second channel according to the second filter function for provision of the first output 42 (such as a first primary output 42A to the first receiver 7 and a first secondary output 42B to the second receiver 8). The second filter function is optionally different from the first filter function.

Figure 3:
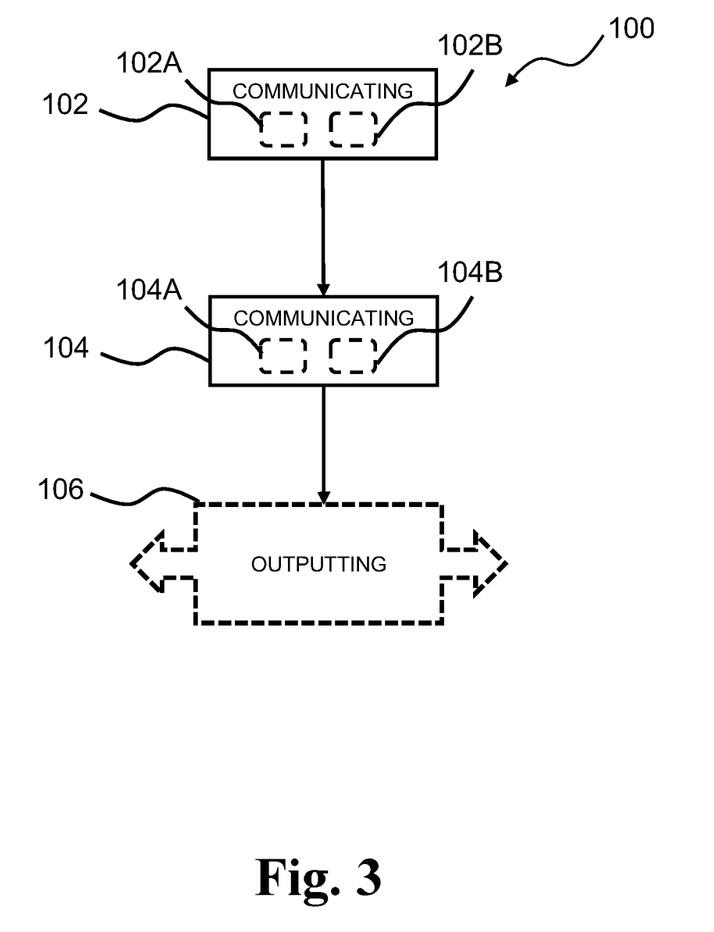
FIG. 3 is a flow diagram of an exemplary method according to the disclosure.

FIG. 3 is a flow diagram of an exemplary method for operating a communication device of a hearing protection apparatus comprising a hearing protection device, the communication device comprising a processing unit, a memory, a radio interface comprising a digital radio interface, and a hearing protection device interface.

The method 100 comprises communicating 102 a first input and/or a first output with the hearing protection device via the hearing protection device interface. The method 100 comprises communicating 104 a second input and/or a second output with a radio unit via the digital radio interface. In one or more exemplary methods, the method comprises obtaining 102A the first input from the hearing protection device via the hearing protection device interface. In one or more exemplary methods, the method comprises transmitting 102B the first output to the hearing protection device via the hearing protection device interface. In one or more exemplary methods, the method comprises obtaining 104A the second input from the radio unit via the radio interface. In one or more exemplary methods, the method comprises transmitting 104B the second output to the radio unit via the radio interface. In one or more exemplary methods, the method comprises outputting 106 the first output via the hearing protection device interface.

The use of the terms "first", "second", "third" and "fourth", "primary", "secondary", "tertiary" etc. does not imply any particular order, but are included to identify individual elements.

Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa. It may be appreciated that FIGS. 1-3 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example communication devices, methods, and/or server devices which may be comprised in, or a part of, or are further modules or operations which may be taken in addition to the modules or operations of the solid line example communication devices and/or methods. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary communication devices, methods, and/or server devices may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES 1 network
2 hearing protection device
3 hearing protection system
4, 4A, 4B communication device
5 communication system
6, 6A, 6B radio unit
6C auxiliary radio unit
7 first receiver
8 second receiver
9 first ear protector, first earpiece, first earmuff
10 first connection
11 second ear protector, second earpiece, second earmuff
12 second connection
13 hearing protection apparatus
14 processing unit
16 radio interface
16A first radio interface
16B second radio interface
17, 17C cable
18A first radio connector
18B second radio connector
19 push-to-talk interface
20 interface
22 memory
23 first input
24 first input signal
25 second input
26 second input signal
27 second audio input signal
28 first microphone
29 first audio input
29A first primary input
29B first secondary input
30 second microphone
32 second output
36 voice microphone
38 voice input
40, 40B hearing protection device interface
42 first output
42A first primary output
42B first secondary output
44A first audio output
44B second audio output
45 push-to-talk transceiver
46 push-to-talk connector
47, 48 remote push-to-talk button
PTT_1 first push-to-talk interface, first push-to-talk button
PTT_2 second push-to-talk interface, second push-to-talk button
PTT_3 third push-to-talk interface, third push-to-talk button
PTT_4 fourth push-to-talk interface, fourth push-to-talk button
100 method for operating a communication device of a hearing protection apparatus
102 communicating a first input and/or a first output with the hearing protection device via the hearing protection device interface
102A obtaining the first input from the hearing protection device via the hearing protection device interface
102B transmitting the first output to the hearing protection device via the hearing protection device interface
104 communicating a second input and/or a second output with a radio unit via the digital radio interface
104A obtaining the second input from the radio unit via the radio interface
104B transmitting the second output to the radio unit via the radio interface
106 outputting the first output via the hearing protection device interface

The invention claimed is:

1. A communication device for a hearing protection apparatus comprising a hearing protection device, the communication device comprising:
a processing unit;
a memory;
a radio interface; and
a hearing protection device interface,
wherein the processing unit is configured to obtain a first input from the hearing protection device and/or transmit a first output to the hearing protection device via the hearing protection device interface, and wherein the radio interface comprises a digital radio interface comprising a radio connector, wherein the radio connector comprises terminals for connection to a radio unit, the processing unit being configured to obtain a second input from a radio unit and/or transmit a second output to the radio unit via the digital radio interface, wherein the communication device comprises a first push-to-talk interface, PTT 1, and a second push-to-talk interface, PTT 2, and wherein the communication device is configured to communicate to two or more channels including a first channel and a second channel via the digital radio interface, and wherein the first push-to-talk interface is assigned to the first channel and the second push-to-talk interface is assigned to the second channel, and wherein the communication device is configured as an internet protocol, IP, node.

2. Communication device according to claim 1, wherein the first output is based on the second input and/or the second output is based on the first input.

3. Communication device according to claim 1, the digital radio interface is a first digital radio interface associated with the first push-to-talk interface and/or wherein the radio interface comprises a second radio interface being an analogue radio interface associated with the second push-to-talk interface.

4. Communication device according to claim 1, wherein the first channel is a first talk-group channel assigned to a first talk-group.

5. Communication device according to claim 4, wherein the communication device is configured to transmit to the first talk-group on the first channel in response to receiving a first request via the first push-to-talk interface.

6. Communication device according to claim 1, wherein the digital radio interface comprises one or more of a universal serial bus, USB, interface, and an ethernet interface.

7. Communication device according to claim 1, wherein the communication device is configured to encode the first input from the hearing protection device for provision of the second output to the radio unit via the digital radio interface.

8. Communication device according to claim 1, wherein the communication device is configured to decode the second input from the radio unit for provision of the first output to the hearing protection device via the hearing protection device interface.

9. Communication device according to claim 1, wherein the communication device is configured to select a first output scheme and determine the first output based on the second input on the first channel and/or the second channel in accordance with the first output scheme.

10. Communication device according to claim 9, wherein the first output scheme comprises a first 3D processing scheme associated with the first channel and a second 3D processing scheme associated with the second channel, and wherein the first output is based on the first 3D processing scheme and the second 3D processing scheme.

11. A method for operating a communication device of a hearing protection apparatus comprising a hearing protection device, the communication device comprising a processing unit, a memory, a radio interface comprising a digital radio interface comprising a radio connector, wherein the radio connector comprises terminals for wired connection to a radio unit, and a hearing protection device interface, the communication device comprising a first push-to-talk interface, PTT 1, and a second push-to-talk interface PTT 2, wherein the communication device is configured as an internet protocol, IP, network node, the method comprising:

communicating a first input and/or a first output with the hearing protection device via the hearing protection device interface; and communicating a second input and/or a second output with a radio unit via the digital radio interface; and communicating to two or more channels including a first channel and a second channel via the digital radio interface, wherein the first push-to-talk interface is assigned to the first channel and the second push-to-talk interface is assigned to the second channel.

12. A communication device for a hearing protection apparatus comprising a hearing protection device, the communication device comprising:

a processing unit;

a memory;

a radio interface; and a hearing protection device interface, wherein the processing unit is configured to obtain a first input from the hearing protection device and/or transmit a first output to the hearing protection device via the hearing protection device interface, and wherein the radio interface comprises a digital radio interface comprising a radio connector, where the radio connector comprises terminals for wired connection for wired connection to a radio unit, the processing unit being configured to obtain a second input from a radio unit and/or transmit a second output to the radio unit via the digital radio interface, wherein the communication device comprises a first push-to-talk interface, PTT_1, and a second push-to-talk interface, PTT_2, and wherein the communication device is configured to communicate to two or more channels including a first channel and a second channel via the digital radio interface, and wherein the communication device is configured as an internet protocol, IP, network node.

13. Communication device according to claim 12, wherein the first push-to-talk interface is assigned to the first channel and the second push-to-talk interface is assigned to the second channel.

14. Communication device according to claim 13, wherein the first channel is a first talk-group channel assigned to a first talk-group.

15. Communication device according to claim 14, wherein the second channel is a second talk-group channel assigned to a second talk-group.

16. Communication device according to claim 15, wherein the communication device is configured to select a first output scheme and determine the first output based on the second input on the first channel and/or the second channel in accordance with the first output scheme.

* * * * *